(12) United States Patent
Heinke et al.

(10) Patent No.: US 8,003,941 B1
(45) Date of Patent: Aug. 23, 2011

(54) SYSTEM AND METHOD FOR PROVIDING A REMOTE USER INTERFACE FOR A THERMAL IMAGER

(75) Inventors: Thomas Heinke, Santa Cruz, CA (US); Stefan H. Warnke, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 12/074,381

(22) Filed: Mar. 3, 2008

Related U.S. Application Data

(60) Provisional application No. 60/904,282, filed on Mar. 1, 2007.

(51) Int. Cl.
*G01J 5/00* (2006.01)

(52) U.S. Cl. .................................................. 250/330

(58) Field of Classification Search ............. 250/330
See application file for complete search history.

(56) References Cited

U.S. PATENT DOCUMENTS

| | | | |
|---|---|---|---|
| 4,634,294 A | 1/1987 | Christol et al. | |
| 5,386,117 A | 1/1995 | Piety et al. | |
| 5,637,871 A | 6/1997 | Piety et al. | |
| 5,675,149 A * | 10/1997 | Wood et al. | 250/332 |
| 6,417,797 B1 * | 7/2002 | Cousins et al. | 342/179 |
| 7,304,297 B1 | 12/2007 | King et al. | |
| 7,369,156 B1 | 5/2008 | Heinke et al. | |
| 2006/0091310 A1 * | 5/2006 | Furry | 250/330 |
| 2006/0125800 A1 * | 6/2006 | Janik | 345/173 |
| 2007/0235648 A1 * | 10/2007 | Teich et al. | 250/330 |

OTHER PUBLICATIONS

Users Manual Fluke Ti20 Thermal Imager, Jan. 2006.
Brochure "Intel—PD6722—Implementing DMA Functionality," May 2001.

* cited by examiner

*Primary Examiner* — David P Porta
*Assistant Examiner* — Marcus H Taningco
(74) *Attorney, Agent, or Firm* — Nelson Mullins Riley & Scarborough, LLP

(57) ABSTRACT

A thermal imaging system having a remote user interface comprises a portable thermal imager (such as a handheld thermal imager) having a communication interface for transfer of data. The imager further has an on-board memory in which image data is stored as well as an imager display to show a processed thermal image based on the image data stored in memory. A remote computer is operative to communicate with the thermal imager via the communication interface. The computer runs software operative to transfer the image data to the computer and show the processed thermal image on a computer display thereof on a real-time basis.

4 Claims, 5 Drawing Sheets

US 8,003,941 B1

SYSTEM AND METHOD FOR PROVIDING A REMOTE USER INTERFACE FOR A THERMAL IMAGER

PRIORITY CLAIM

This application claims the benefit of provisional application Ser. No. 60/904,282, filed Mar. 1, 2007, which is relied upon and incorporated herein by reference in its entirety.

BACKGROUND OF THE INVENTION

The present invention relates generally to thermal imagers. More particularly, the invention relates to a system and method for providing control of a thermal imager at a remote user interface.

Thermal imaging cameras are used in a wide variety of applications, such as predictive maintenance in industrial facilities. Such cameras, often simply referred to as "thermal imagers," include some type of infrared engine that converts infrared energy into electrical signals. For example, many thermal imagers include a detector array located in the focal plane of the camera optics. Infrared energy impinging the focal plane array (FPA) is read out for further processing on a pixel-by-pixel basis.

The "raw" data produced by the infrared engine is then converted through digital signal processing techniques to the visible image that can be displayed. In this regard, objects in the image are often depicted in colors corresponding to their relative temperature. Text and other graphics can also be overlaid on the thermal image, or provided in different zones of the display. Some thermal imagers are also capable of determining and displaying a temperature measurement for the object at the "cross hairs" of the thermal image. The processed images thus produced may be stored in local memory before subsequent download to a personal computer, such as using a serial data link.

SUMMARY OF THE INVENTION

According to one aspect, the present invention provides a thermal imaging system having a remote user interface. The system comprises a portable thermal imager (such as a handheld thermal imager) having a communication interface for transfer of data. The imager further has an on-board memory in which image data is stored as well as an imager display to show a processed thermal image based on the image data stored in memory.

A remote computer is operative to communicate with the thermal imager via the communication interface. The computer runs software operative to transfer the image data to the computer and show the processed thermal image on a computer display thereof on a real-time basis.

In some exemplary embodiments, the software running on the remote computer is operative to generate at least one graphical representation on the computer display representing an actuator on the thermal imager. For example, the software may be operative to generate a plurality of graphical representations indicative of respective buttons on the thermal imager. In such embodiments, the software also preferably operates to determine when a computer user has selected the graphical representation and responsively communicate a corresponding command back to the thermal imager.

Often, portions of a target object being viewed with the thermal imager are shown in the processed thermal image in colors corresponding to relative temperatures thereof. The processed thermal image may further include textual information. Moreover, the processed thermal image may include multiple zones in which various information is shown.

In many embodiments, the communication interface of the thermal imager is operative to communicate with the remote computer via a wired connection. For example, the communication interface may be a universal serial bus interface. Often, it will be desirable for the system to show the processed thermal image simultaneously on the imager display and the computer display.

According to another aspect, the present invention provides a method for use with a portable thermal imager. One step of the method involves utilizing the thermal imager to detect infrared energy emitted by a target object. Electrical signals indicative of the target object are processed using a processor on-board the thermal imager to produce a processed thermal image. The method also involves transferring image data for the processed thermal image to a remote computer on a real-time basis. Next, the processed thermal image is displayed on a computer display of the remote computer.

A still further aspect of the present invention provides a thermal imaging system having a remote user interface. The system comprises a portable thermal imager having a communication interface for transfer of data. The imager has an on-board memory in which image data is stored and an imager display to show a processed thermal image based on the image data stored in the memory.

A remote computer is operative to communicate with the thermal imager via the communication interface. The computer runs software operative to transfer dummy image data to the memory of the thermal imager. As a result, the processed thermal image shown on the imager display will be based on the dummy image data rather than current image data.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
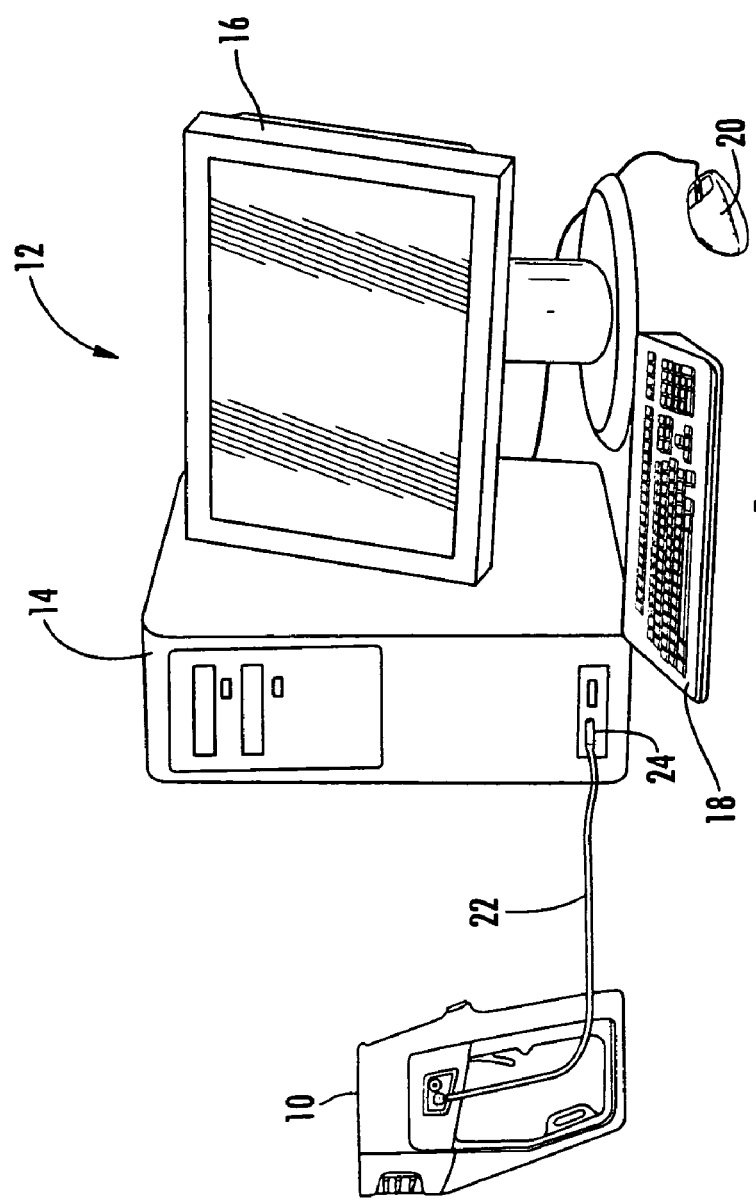
FIG. 1 shows a personal computer being used in accordance with the present invention as a remote user interface for a thermal imager.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Referring now to FIG. 1, a thermal imager 10 is in electrical communication with a conventional personal computer 12. As will be described more fully below, personal computer 12 functions as a user interface for thermal imager 10, allowing remote replication of the imager's controls. In addition, images and other information stored on the computer may be fed to thermal imager 10 for user training or other purposes.

As one skilled in the art will appreciate, the term "computer" as used herein is not limited to a traditional desktop or laptop personal computer. Instead, "computer" is included to cover other devices, such as various personal digital assistants (PDAs), that may be capable of performing the described functionality. In this embodiment, however, computer 12 is a traditional desktop personal computer having a main housing 14 containing processing electronics, disk drives and the like. A suitable computer display 16, in this case an LCD flat screen display, is also provided. The user interacts with computer 12 using keyboard 18 and mouse 20 in the conventional manner.

The invention contemplates various techniques for providing a data link between imager 10 and computer 12, such as various wireless communication protocols. In the illustrated embodiment, however, electrical communication between imager 10 and computer 12 is accomplished using a typical serial cable 22. Cable 22 includes universal serial bus (USB) connectors at each end, one of which plugs into a corresponding port on the front of housing 14 (as indicated at 24).

Figure 2:
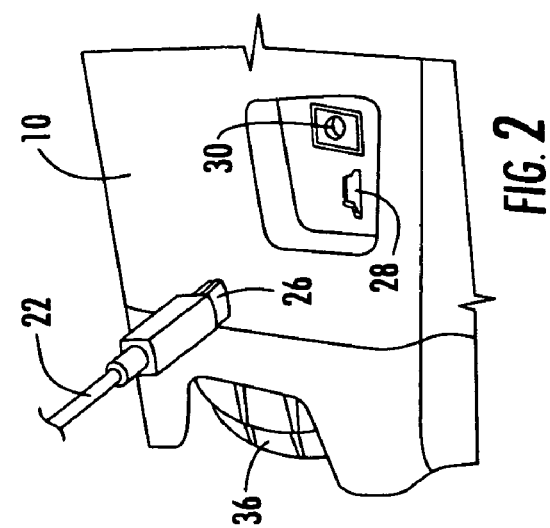
FIG. 2 is an enlarged view showing the USB connector port of the thermal imager shown in FIG. 1.

As can be most clearly seen in FIG. 2, the other connector 26 is configured as a mini-USB connector. Connector 26 is inserted into a corresponding port 28 located on the side of imager 10. In this embodiment, a receptacle 30 is located adjacent to mini-USB port 28 for connecting a battery charger when necessary to recharge the imager's internal batteries.

Figure 4:
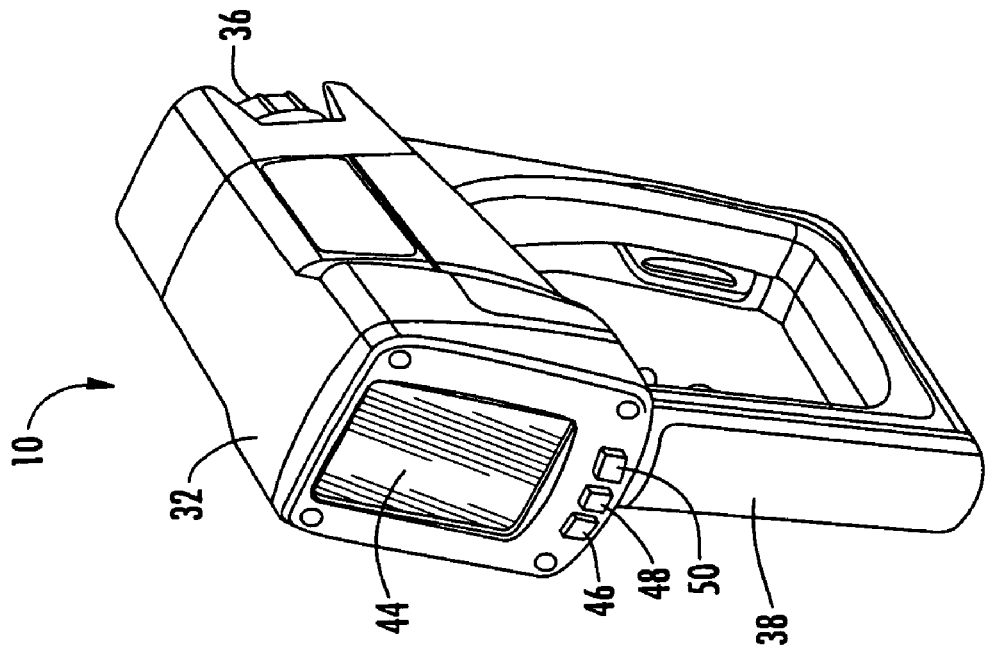
FIG. 4 is a rear perspective view of the thermal imager of FIG. 1.
Figure 3:
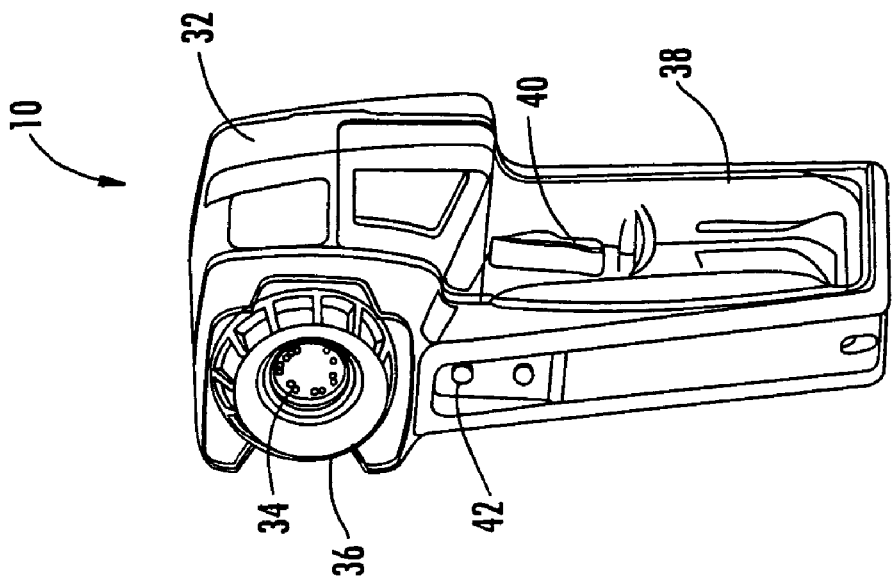
FIG. 3 is a front perspective view of the thermal imager of FIG. 1.

Referring now to FIGS. 3 and 4, certain details about the construction of imager 10 can be more easily explained. As shown, imager 10 includes a housing 32 in which the components of a thermal image camera are located. A lens 34 (FIG. 3) carried by a focus ring 36 is located near the front of housing 32. As one skilled in the art will appreciate, the target energy enters the device through this lens.

Housing 32 includes a handle 38 by which the operator holds and aims the device. A trigger 40, located on handle 38, permits the user to store selected images in the device's internal memory. In the illustrated embodiment, laser diode 42 (FIG. 2) projects a dot of light forward of the imager to facilitate aiming.

As shown in FIG. 4, a display 44 is preferably located at the rear of imager 10. In this case, the display is a color display of the LCD type. A plurality of function buttons 46, 48 and 50 are also located on the rear portion of housing 32. In this embodiment, buttons 46, 48 and 50 are used as "soft keys" to navigate the menu structure of the imager, access functions and select values for adjustable parameters. Button 48 is also used to turn the imager "on" and "off" (when pressed for a selected period of time, e.g., 2 seconds).

Referring again to FIG. 1, the software on computer 12 may be used to download information to and upload information from thermal imager 10. For example, processed images that have been previously obtained through the use of imager 10 in the field can be read out of its internal memory into computer 12. Once the data is located in computer 12, it can be permanently stored, or used in the creation of maintenance reports and the like.

In addition, however, the software allows the current image being seen by thermal imager 10 to be transferred to computer 12 on a real-time basis. As a result, an operator sitting at computer 12 can see the same image on the computer's display. Moreover, "dummy" images can be transferred in real-time from computer 12 to imager 10. These will appear as "real" processed images to an operator of imager 10. Among other benefits, these techniques are particularly helpful in training new operators in the use of imager 10.

Figure 5:
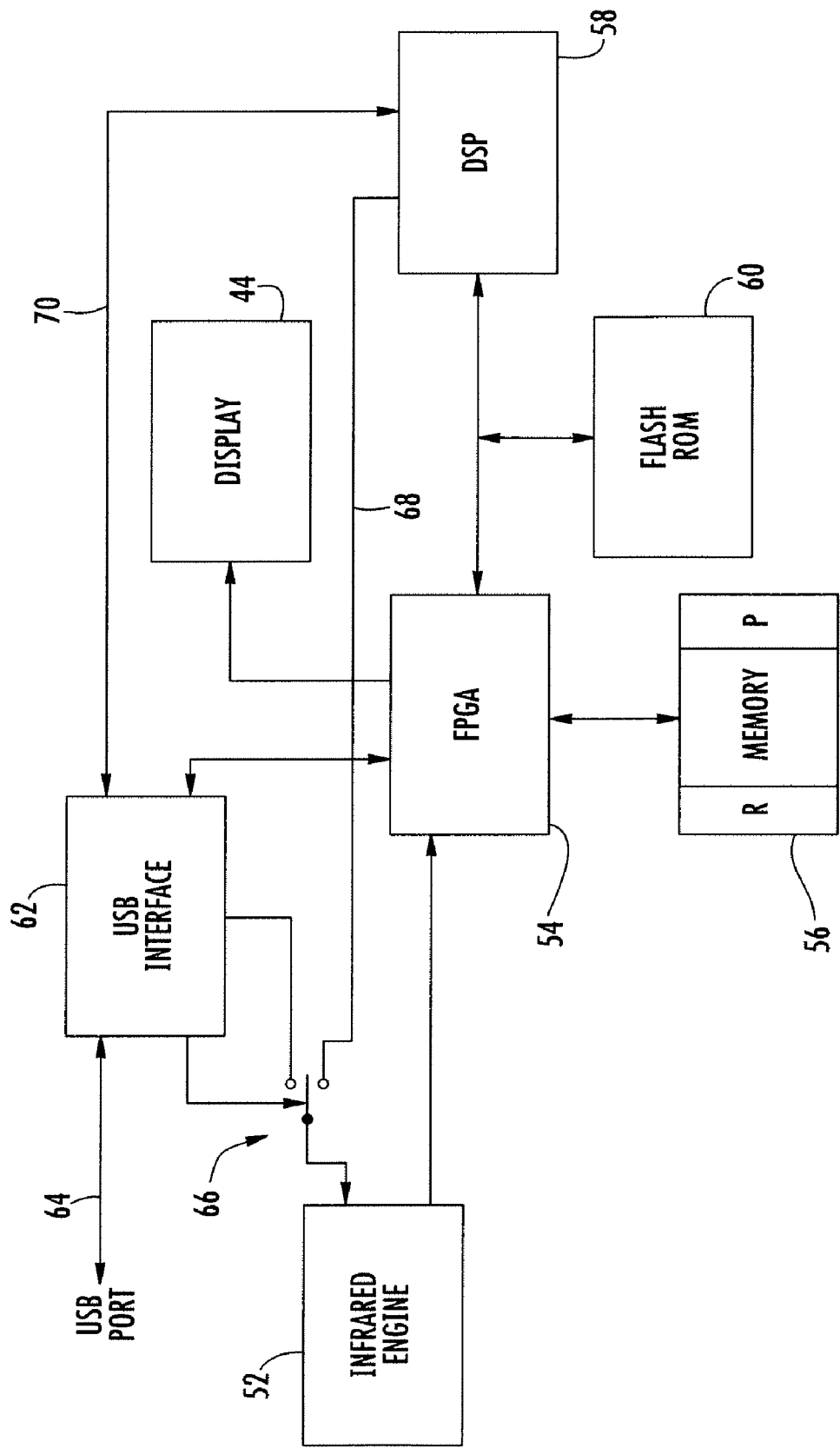
FIG. 5 is a diagrammatic representation showing functional components of a thermal imager that may be used in the implementation of the present invention.

Certain internal components of imager 10 useful in the present invention can be most easily described with reference to FIG. 5. As shown, imager 10 includes an infrared engine 52 that converts infrared radiation into electrical signals. Typically, engine 52 will include a focal plane array (FPA), as well as some electronic circuitry for preprocessing of the data. The "raw" data output by the infrared engine is fed to a FPGA ("field programmable gate array") 54. The "raw" data is stored in certain memory locations (indicated by the designation "R") within volatile memory 56.

As one skilled in the art will appreciate, the "raw" data stored in memory 56 is not in a form suitable for being shown on display 44. Accordingly, the processed image is produced from the raw image data by digital signal processor ("DSP") 58. Toward this end, raw data is pulled by FPGA 54 from memory locations R and transferred to DSP 58. After processing in DSP 58, the processed image data is then returned to memory 56 via FPGA 54. This processing includes the generation of a visible image using a color scale indicative of each object's relative temperature. Various graphics and textual overlays are also produced. The processed image data is stored in locations within memory 56 (indicated by the designation "P") other than those in which the raw data is located. FPGA 54 then functions as a buffer to pull the processed image data out of memory 56 and provide it to display 44.

Imager 10 also includes a flash read only memory ("ROM") 60. ROM 60 stores firmware run by DSP 58 during the processing of the raw image data. When DSP 58 powers up, it reads its program from ROM 60 and operates accordingly. In addition, ROM 60 maintains images stored by the operator during use of imager 10 for subsequent download.

A USB interface 62 is provided to facilitate serial communication with an external computer. As indicated at 64, interface 62 is in electrical communication with the imager's USB port. Interface 62 is also in electrical communication with FPGA 54. This allows access to the memory locations R and P where the raw image data and processed image data are respectively stored. As a result, the processed image data (and the raw image data, if desired) can be read out of the imager 10 on a real-time basis. The image can then be shown on the display of a personal computer, or even projected on the wall in a large conference room for training purposes. In addition, software running on the computer can allow the user to simulate presses of a button on image 10. Again, this is useful for training purposes.

Alternatively, dummy image data (either processed or "raw") can be fed from the computer into the memory of imager 10. Processed image data fed into imager 10 in this manner will overwrite the image that would otherwise be shown on display 44. This can be used to simulate various "real world" conditions in a classroom.

Feeding known "raw" data into imager 10 in this manner can be used to check the calibration of the instrument. In other words, known raw data should produce a known image for display. If the processed image thus produced is other than expected, this indicates a calibration problem with the imager.

As shown, USB interface 62 also controls a "switch" 66. Normally, switch 66 is positioned to allow electrical communication between infrared engine 52 and DSP 58 (via line 68). As a result, DSP 58 can send configuration data to engine 52. Upon receipt of a suitable command, however, switch 66 is "thrown" to allow communication between USB interface 62 and infrared engine 52. This allows infrared engine 52 to be controlled from the PC, which is also useful for testing and calibration purposes. One skilled in the art will appreciate that "switch" 66 represents a function of the device, and may not be realized by a physical switch.

As noted above, DSP 58 normally reads its program from ROM 60 and operates accordingly. The illustrated configuration, however, allows direct communication between USB interface 62 and DSP 58, as indicated at line 70. As a result, a different program can be supplied into DSP 58 from the computer, such as for testing purposes.

Figure 6:
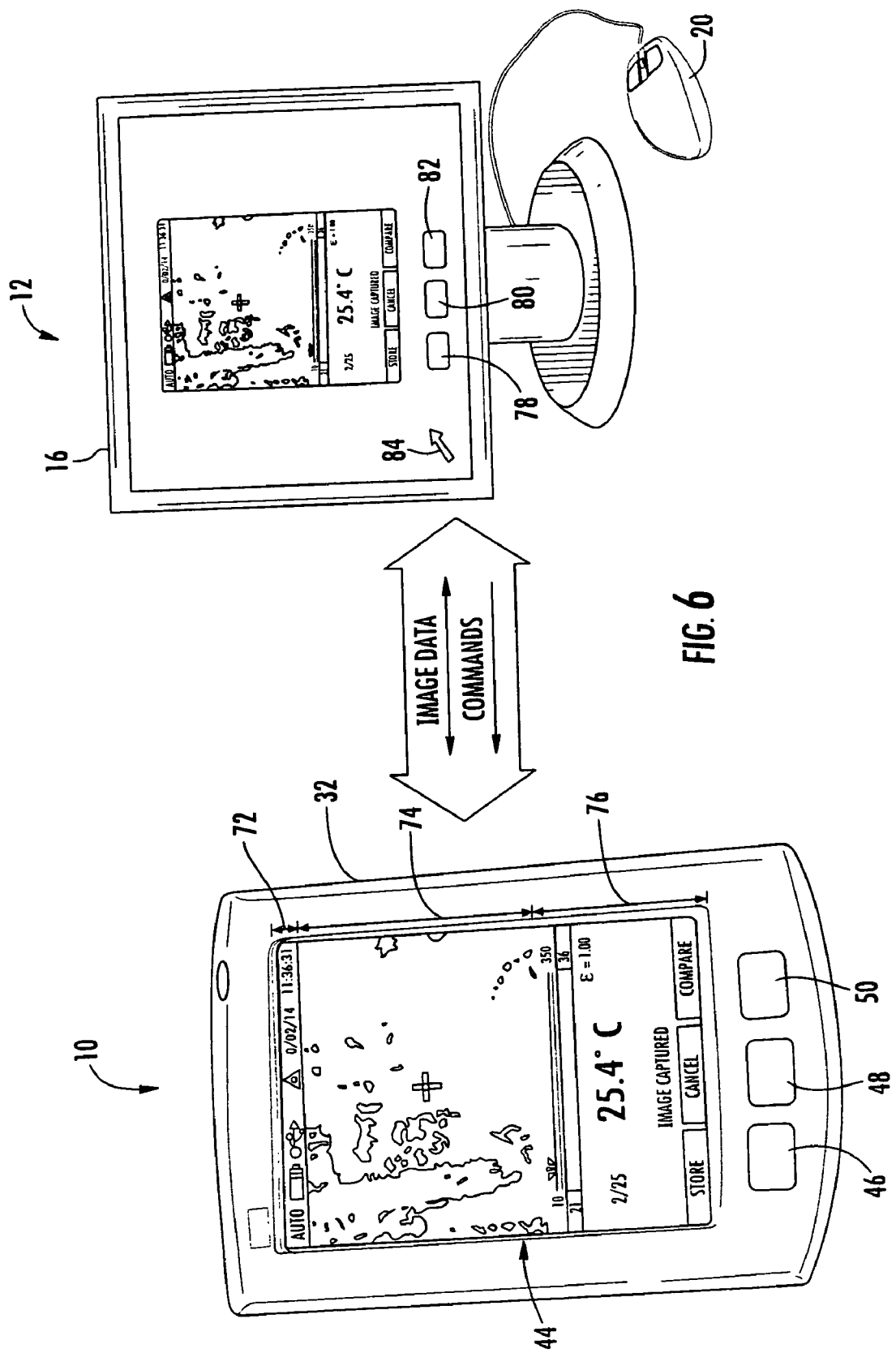
FIG. 6 shows an exemplary thermal imager display along with a corresponding display on a computer monitor in accordance with the present invention.

Referring now to FIG. 6, an exemplary processed image is being shown on display 44. As can be seen, the processed image may be divided into a number of zones which show different information. For example, the header zone 72 displays information such as imager status, battery charge state, power source and connection status. It can also be seen that header zone 72 in this case displays the USB symbol, thus indicating that imager 10 is connected via its USB port to a personal computer. The image zone 74 displays live, frozen and stored thermal images. The information zone 76 displays imager settings, status comments and selection options. This zone also indicates the temperature measurement (in this case, 25.4° C.) at the "crosshairs" of the image zone 74. A temperature gradient scale may also be provided in this zone.

As can be seen, the entire display of thermal imager 10 is also depicted on computer display 16. In addition, the software running on the computer has generated "buttons" 78, 80 and 82 corresponding to buttons 46, 48 and 50 on imager 10 itself. These graphically generated buttons can be selected using mouse 20. For example, the user of the computer could simply move the computer cursor 84 over the desired "button" and select (such as by a left click).

Figure 7:
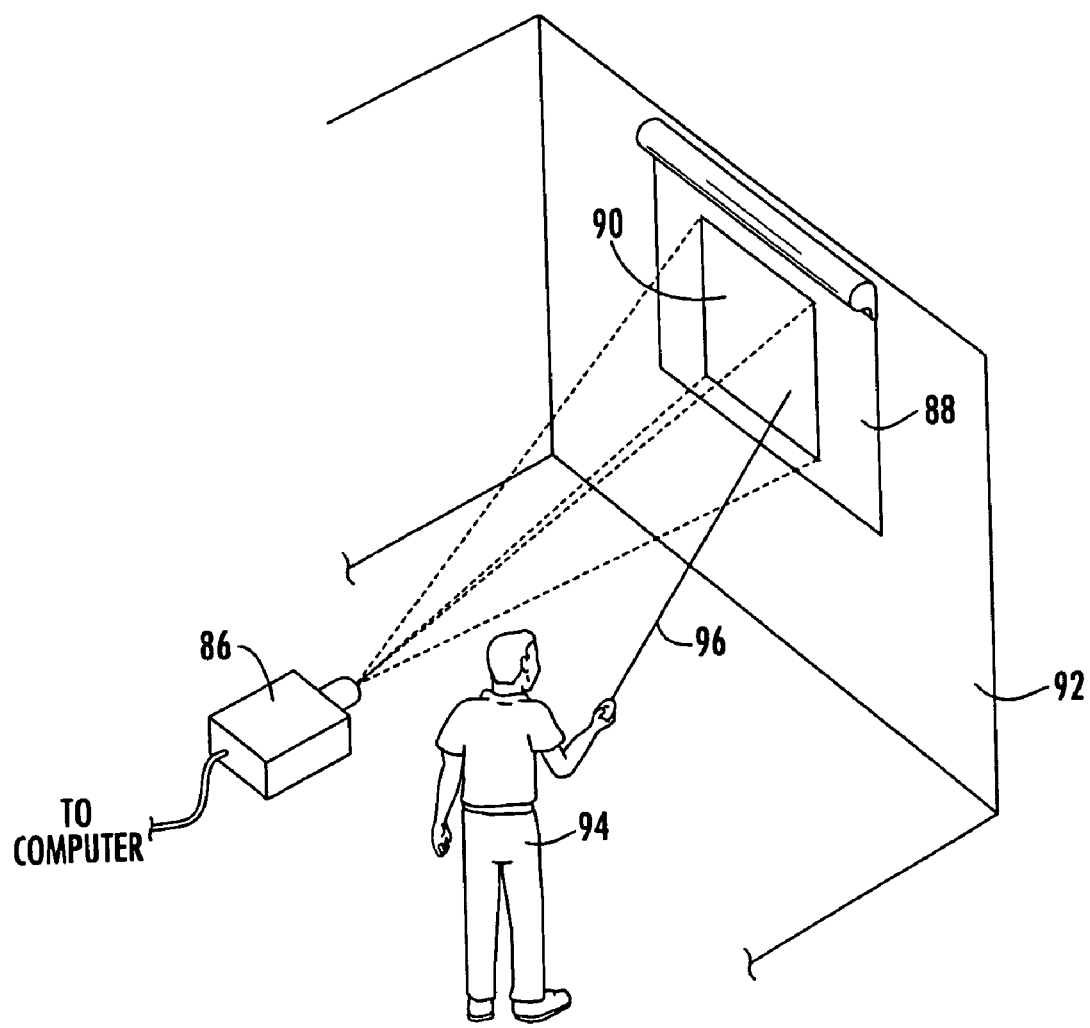
FIG. 7 is a diagrammatic representation showing use of the present invention in a classroom setting.

FIG. 7 illustrates use of the present invention in a classroom or conference room setting. In this case, the computer is connected to a projector 86 which projects the processed thermal image onto a screen 88, as indicated at 90. As shown, screen 90 is located on a wall 92 of the room. An instructor 94 discusses various aspects of the processed thermal image and operation of imager 10 with pupils in attendance. Typically, these pupils would be individuals undergoing training in the use of thermal imager 10. As shown, instructor 94 may utilize a pointer, such as laser pointer 96, to indicate particular items of interest in the thermal image.

It can thus be seen that the present invention provides a novel system and method for transferring information to and from a thermal imager on a real time basis. While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A thermal imaging system having a remote user interface, said system comprising:
   a portable thermal imager having a communication interface for transfer of data, said imager having an on-board memory in which image data is stored;
   said thermal imager further having an imager display to show a processed thermal image based on said image data stored in said memory;
   a remote computer operative to communicate with said thermal imager via said communication interface; and
   said computer running software operative to transfer dummy image data to said memory of said thermal imager;
   whereby said processed thermal image shown on said imager display will be based on said dummy image data rather than current image data.

2. A thermal imaging system as set forth in claim 1, wherein said portable thermal imager is a handheld device.

3. A thermal imaging system as set forth in claim 1, wherein said communication interface of said thermal imager is operative to communicate with said remote computer via a wired connection.

4. A thermal imaging system as set forth in claim 3, wherein said communication interface of said thermal imager is a universal serial bus interface.

\* \* \* \* \*